United States Patent
Hwang et al.

(10) Patent No.: US 9,473,717 B2
(45) Date of Patent: Oct. 18, 2016

(54) COUNTING DEVICE FOR REDUCING POWER CONSUMPTION IN BINNING MODE AND METHOD THEREFOR

(71) Applicant: SK hynix Inc., Gyeonggi-do (KR)

(72) Inventors: Won-Seok Hwang, Gyeonggi-do (KR); Si-Wook Yoo, Gyeonggi-do (KR)

(73) Assignee: SK Hynix, Gyeonggi-do (KR)

( * ) Notice: Subject to any disclaimer, the term of this patent is extended or adjusted under 35 U.S.C. 154(b) by 290 days.

(21) Appl. No.: 14/052,401

(22) Filed: Oct. 11, 2013

(65) Prior Publication Data

US 2014/0340551 A1    Nov. 20, 2014

(30) Foreign Application Priority Data

May 20, 2013  (KR) .................. 10-2013-0056405

(51) Int. Cl.
H04N 5/228   (2006.01)
H04N 5/335   (2011.01)
H03M 1/00    (2006.01)
H04N 5/369   (2011.01)
H04N 5/345   (2011.01)

(52) U.S. Cl.
CPC ............ *H04N 5/3698* (2013.01); *H04N 5/345* (2013.01)

(58) Field of Classification Search
CPC ....... H04N 5/378; H04N 5/347; H04N 5/369
USPC .................. 348/330, 301, 304, 220.1, 222.1, 348/231.99; 341/126
See application file for complete search history.

(56) References Cited

U.S. PATENT DOCUMENTS

| | | | |
|---|---|---|---|
| 8,330,635 B2* | 12/2012 | Hisamatsu ............. | H03K 23/62 341/118 |
| 2004/0027462 A1* | 2/2004 | Hing ........................ | G01J 3/02 348/222.1 |
| 2004/0165080 A1* | 8/2004 | Burks ................... | H04N 3/1562 348/222.1 |
| 2006/0274176 A1* | 12/2006 | Guidash ............ | H01L 27/14643 348/300 |
| 2008/0084341 A1* | 4/2008 | Boemler .............. | H04N 5/3458 341/143 |
| 2008/0244228 A1* | 10/2008 | Overdick ............. | H04N 3/1562 712/39 |
| 2011/0261061 A1* | 10/2011 | Lees ........................ | G06T 1/20 345/501 |
| 2012/0026368 A1* | 2/2012 | Cote ..................... | G06T 3/4015 348/242 |
| 2012/0140089 A1* | 6/2012 | Koh ................... | H04N 5/23245 348/220.1 |
| 2014/0263964 A1* | 9/2014 | Yang ..................... | H04N 5/347 250/208.1 |

FOREIGN PATENT DOCUMENTS

| | | |
|---|---|---|
| KR | 1020120062383 | 6/2012 |
| KR | 1020120123849 | 11/2012 |

* cited by examiner

*Primary Examiner* — Sinh Tran
*Assistant Examiner* — Xi Wang
(74) *Attorney, Agent, or Firm* — IP & T Group LLP

(57) ABSTRACT

A counting device includes a control unit suitable for generating a control signal including a first control signal and a second control signal, a first operation unit suitable for performing a logic operation for pixel signals of a pixel array and a control signal, wherein pixel signals of used column in the pixel array are transferred by using the first control signal, and pixel signals of unused column in the pixel array are blocked by using the second control signal during a binning mode operation, a second operation unit suitable for performing a logic operation for a counter clock and an output signal of the first operation unit, and a counting unit suitable for counting an output signal of the second operation unit.

12 Claims, 5 Drawing Sheets

COUNTING DEVICE FOR REDUCING POWER CONSUMPTION IN BINNING MODE AND METHOD THEREFOR

CROSS-REFERENCE TO RELATED APPLICATIONS

The present application claims priority of Korean Patent Application No. 10-2013-0056405, filed on May 20, 2013, which is incorporated herein by reference in its entirety.

BACKGROUND

1. Field

Exemplary embodiments of the present invention relate to a complementary metal oxide semiconductor (CMOS) image sensor, and more particularly, to a counting device for reducing a power consumption of a counter in a CMOS image sensor having a column parallel structure using a binning mode and a method therefor.

2. Description of the Related Art

In a conventional CMOS image sensor, regardless of column status, a counter array operation was simultaneously performed during a binning mode for summing a charge of neighboring pixels in a read-out operation. Thus, a column, which is not used in a binning mode, wastes an unnecessary power.

For example, since a CMOS image sensor having a column parallel structure using a single slope analog-digital converter (ADC) has a column, which is not used in the binning mode operation, unnecessary power consumption may occur from the column, which is not used in the binning mode operation.

Moreover, a counter clock speed increases during 2×2 or 3×3 binning mode operation. A power consumption, which is caused by the increase of the counter clock speed, may cause a supply voltage drop as much as $I^2 \times R$, where I denotes a current, and R denotes a resistance. Thus, a stable circuit operation may be stopped.

SUMMARY

Various exemplary embodiments of the present invention are directed to a counting device for adjusting an input of a counter to prevent a power from being consumed at a counter of a column, which is not used, in a binning mode operation of a counter and a method therefor.

Moreover, various embodiments of the present invention are directed to a counting device for adjusting a dock of a counter to prevent a power from being consumed at a counter of a column, which is not used, in a binning mode operation of a counter and a method therefor.

In accordance with an exemplary embodiment of the present invention, a counting device includes a control unit suitable for generating a control signal including a first control signal and a second control signal, a first operation unit suitable for performing a logic operation for pixel signals of a pixel array and a control signal, wherein pixel signals of used column in the pixel array are transferred by using the first control signal, and pixel signals of unused column in the pixel array are blocked by using the second control signal during a binning mode operation, a second operation unit suitable for performing a logic operation for a counter clock and an output signal of the first operation unit, and a counting unit suitable for counting an output signal of the second operation unit.

In accordance with another exemplary embodiment of the present invention, a counting device includes a control unit suitable for generating a counter clock and a control signal, a first operation unit suitable for performing a logic operation for the counter clock and the control signal to block a counter clock corresponding to unused column in the pixel array during a binning mode operation, a second operation unit suitable for performing a logic operation for pixel signals of a pixel array and the counter clock, wherein pixel signals of used column in the pixel array are transferred by using the counter clock, and pixel signals of unused column in the pixel array are blocked by using the output signal of the first operation unit, and a counting unit suitable for counting an output signal of the second operation unit.

In accordance with yet another exemplary embodiment of the present invention, a counting method includes performing a first logic operation for pixel signals of a pixel array and a control signal including a first control signal and a second control signal outputted from a control unit, wherein pixel signals of used column in the pixel array are transferred by using the first control signal, and pixel signals of unused column in the pixel array are blocked by using the second control signal during a binning mode operation, performing a second logic operation for a counter clock and a first operation result, and counting a second logic operation result.

In accordance with yet another exemplary embodiment of the present invention, a counting method includes performing a first logic operation for a counter clock and a control signal outputted from a control unit during a binning mode operation, and blocking the counter clock for unused column in the pixel array, performing a second logic operation for a pixel signal of a pixel array and the counter clock, wherein pixel signals of used column in the pixel array are transferred by using the counter clock from the control unit, and pixel signals of unused column in the pixel array are blocked by using a first logic operation result, and counting a second logic operation result.

DETAILED DESCRIPTION

Figure 1:
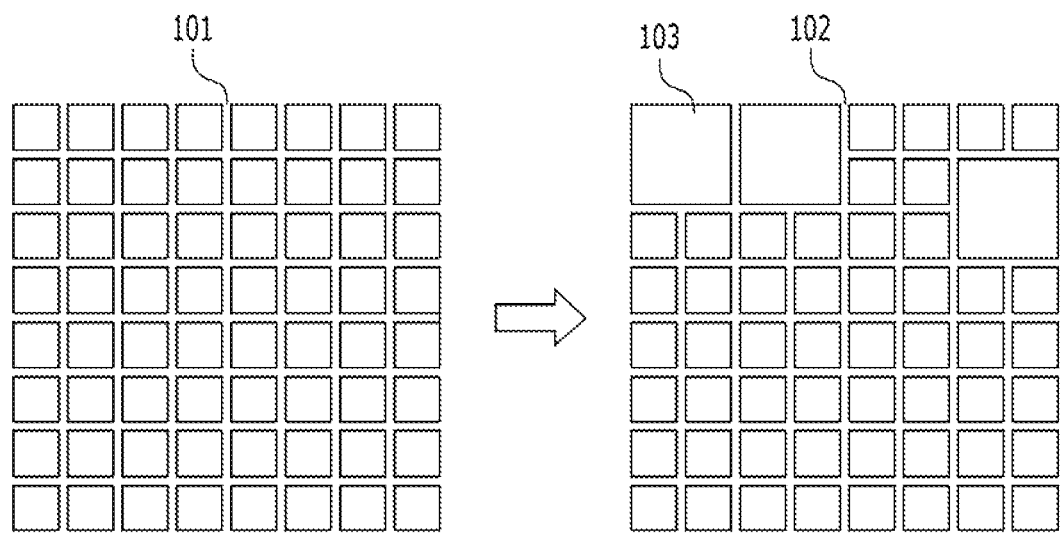
FIG. 1 is a diagram illustrating a conventional pixel binning process.

Various exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, reference numerals correspond directly to the like numbered parts in the various figures and embodiments of the present invention. It is also noted that in this specification, "connected/coupled" refers to one component not only directly coupling another component but also indirectly coupling another component through an intermediate component. In addition, a singular form may include a plural form as long as it is not specifically mentioned in a sentence.

FIG. 1 is a diagram illustrating a conventional pixel binning process.

Referring to FIG. 1, a first pixel array 101 represents that pixels are not under a binning state, and a second pixel array 102 represents that some part of pixels are under a 2×2 binning state. The pixels 103 of the second pixel array 102, which are under the binning state, are regarded as a single pixel.

In general, a pixel binning unit (not shown may perform a pixel binning for a current pixel based on an output level of the current pixel.

Herein, to perform the pixel binning for the current pixel represents that the output level of neighboring pixels to the current pixel is added to the output level of the current pixel. In conclusion, since the output level is higher in a case that the pixel binning is performed than in a case that the pixel binning is not performed, the precision of the second pixel array 102 may be improved due to the pixel binning.

When pixels are subjected to the pixel binning, a start point pixel may be randomly set. Moreover, since neighboring pixels to a current pixel may have high probability to form the same object of the current pixel in an image, the pixel binning unit may perform the pixel binning of the neighboring pixels to the current pixel. The pixel binning unit may determine the neighboring pixels to be subjected to the pixel binning for a current pixel so that the current pixel and the neighboring pixels may be determined in form of a rectangular shape, such as 2×2 or 3×3.

Figure 2:
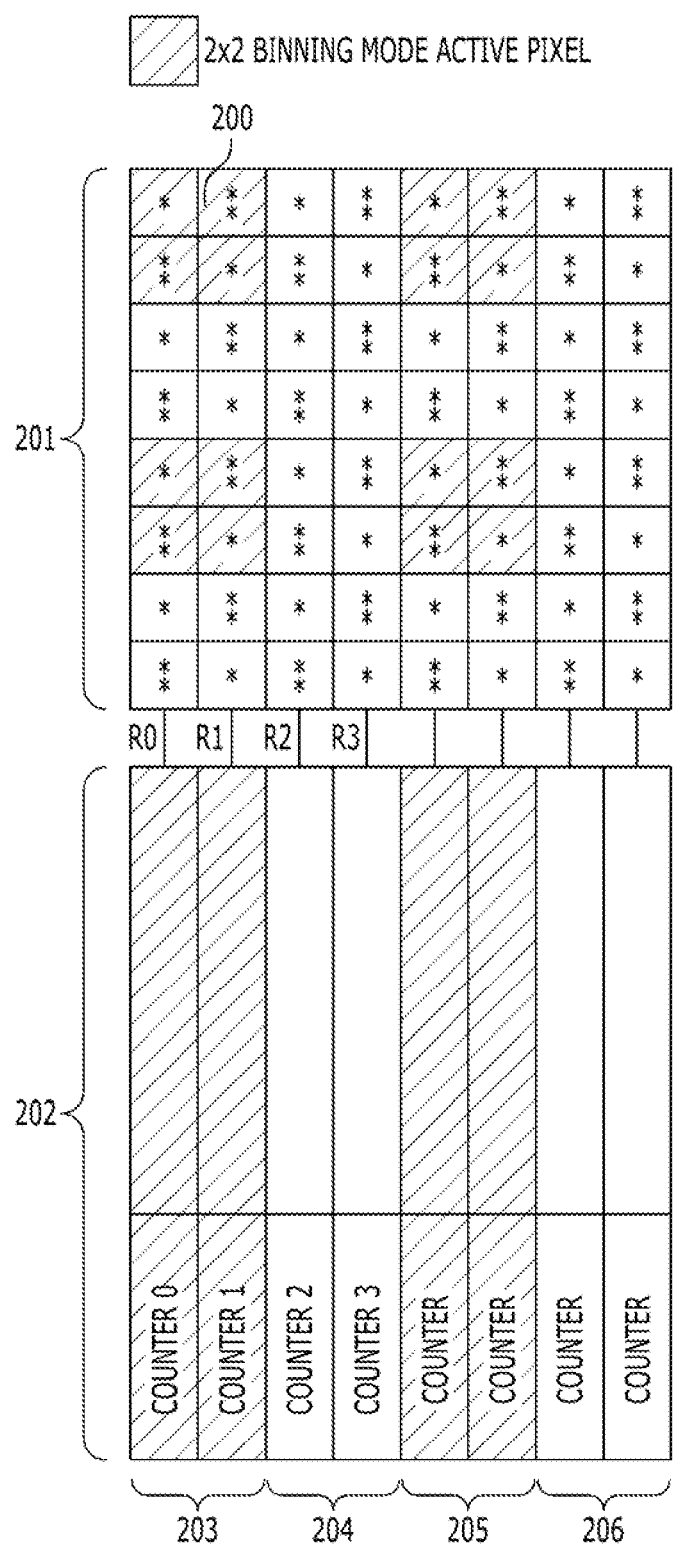
FIG. 2 is a diagram illustrating a conventional CMOS image sensor having a column parallel structure using a single slope ADC.

FIG. 2 is a diagram illustrating a conventional CMOS image sensor having a column parallel structure using a single slope ADC.

FIG. 2 shows 2×2 binning mode active regions in a CMOS in image sensor having a column parallel structure using a single slope ADC. A first pixel array 201 represents a pixel array which includes the 2×2 binning mode active regions 200. A second pixel array 202 represents a single slope ADC array.

As shown in FIG. 2, counters 203 and 205 of used columns and counters 204 and 206 of unused columns exist in the 2×2 binning mode. Moreover, during the 2×2 binning mode operation a counter dock speed increases, an increased counter clock speed may cause power consumption and a supply voltage drop, and a stable circuit operation may be stopped.

Thus, in an exemplary embodiment of the present invention, during a binning mode operation of a counter, an input of a counter is adjusted or blocked to prevent a power from being consumed at the counter for an unused column.

Moreover, in another embodiment of the present invention, during a binning mode operation of a counter, a dock of a counter is adjusted or blocked to prevent a power from being consumed at the counter for an unused column.

Figure 3:
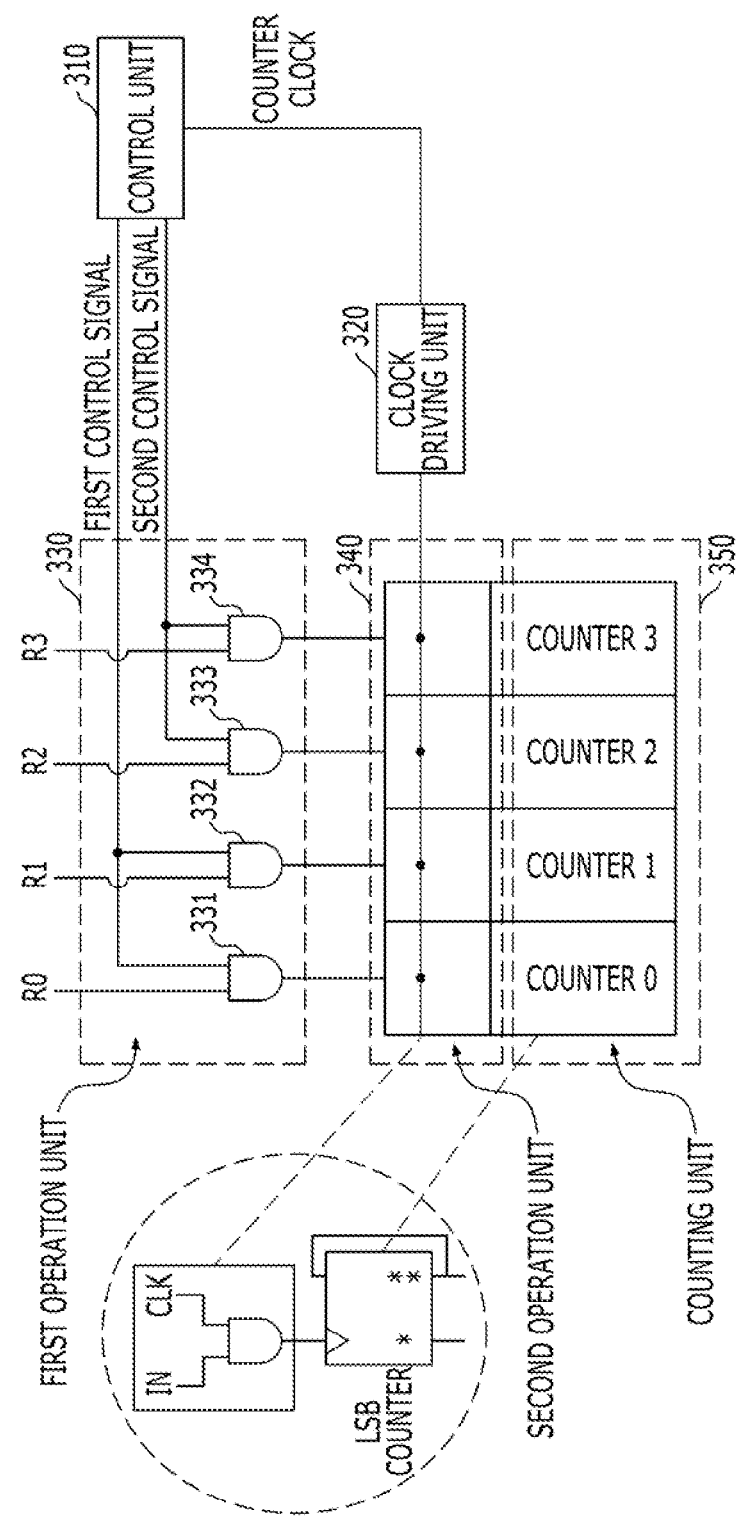
FIG. 3 is a block diagram illustrating a counting device in accordance with an exemplary embodiment of the present invention.

FIG. 3 is a block diagram illustrating a counting device in accordance with an exemplary embodiment of the present invention.

For reference, pixel signals R0, R1, R2 and R3 shown in FIG. 3 are received from a pixel array 201.

As shown in FIG. 3, a counting device in accordance with an exemplary embodiment of the present invention includes a control unit 310, a clocking driving unit 320, a first operation unit 330, a second operation unit 340 and a counting unit 350.

The control unit 310 generates a control signal including a first control signal having a high level voltage and a second control signal having a low level voltage to the first operation unit 330 according to a using state of each column in the pixel array during a binning mode operation. That is, during the binning mode operation, in case that specific columns are used, the control unit 310 transfers a first control signal having a high level voltage to first and second AND gates 331 and 332, which are located on used columns. During the binning mode operation, in case that specific columns are not used, the control unit 310 transfers a second control signal having a low level voltage to third and fourth AND gates 333 and 334, which are located on unused columns. Herein, the control unit 310 may be a controller of a system, which controls a CMOS image sensor, a column controller, or an external controller. Information on the using state of columns in the pixel array may be received from a decoder (not shown) of the pixel array.

The clock driving unit 320 receives a counter dock and drives the second operation unit 340. The first operation unit 330 includes first to fourth AND gates 331 to 334.

The first operation unit 330 performs an AND operation for a pixel signal, which is inputted from the pixel array 201 shown in FIG. 2, and the first control signal or the second control signal transferred in from the control unit 310 according to a using state of each column during the binning mode operation, and blocks the pixel signal of the unused column.

More specifically, the first operation unit 330 receives the pixel signal of the pixel array 201 and the first control signal or the second control signal and performs the AND operation according to the using state of each column during the binning mode operation. The first operation unit 330 transfers a pixel signal of the used column in the pixel array to the second operation unit 340, and blocks the pixel signal of the unused column in the pixel array.

That is, the first and second AND gates 331 and 332 perform the AND operation for the pixel signal of the pixel array 201 and the first control signal according to the used column during the binning mode operation, and output an AND operation result to the second operation unit 340. The third and fourth AND gates 333 and 334 perform the AND operation for the pixel signal of the pixel array 201 and the second control signal according to the unused column during the binning mode operation, and block the pixel signal of the unused column.

Meanwhile, in another embodiment of the present invention, the first operation unit 330 may be implemented as a switching unit for transferring or blocking the pixel signal in response to the first control signal or the second control signal outputted from the control unit 310.

The second operation unit 340 includes a plurality of AND gates. The second operation unit 340 receives an output signal IN of the first operation unit 330 and the counter clock CLK, performs the AND operation, and outputs an AND operation result to the counting unit 350. Herein, two AND gates of the second operation unit 340 corresponding to the unused column do not transfer an operation result to the counting unit 350 since the third and fourth AND gates 333 and 334 block the pixel signal of the unused column. The counter clock CLK may be received from the control unit 310 via the clock driving unit 320.

The counting unit 350 includes first to fourth least significant bit (LSB) counters COUNTER 0 to COUNTER 3. The first and the second LSB counters COUNTER 0 and COUNTER 1 count output signals of the second operation unit 340 and output digital pixel signals, respectively. The third and the fourth LSB counters COUNTER 2 and COUNTER 3 do not perform a counting operation since the third and the fourth LSB counters COUNTER 2 and COUNTER 3 do not receive an output signal from the second operation unit 340.

Figure 4:
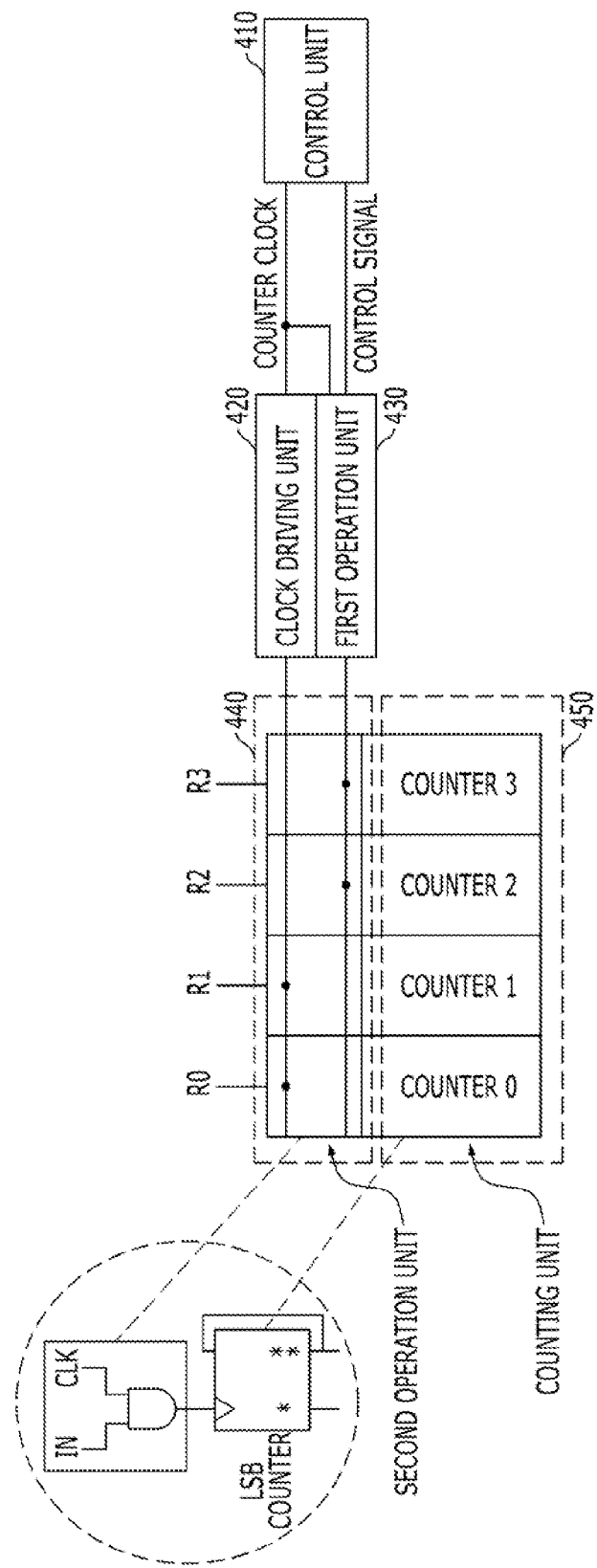
FIG. 4 is a block diagram illustrating a counting device in accordance with another exemplary embodiment of the present invention.

FIG. 4 is a block diagram illustrating a counting device in accordance with another exemplary embodiment of the present invention. The pixel signals R0, R1, R2 and R3 are received from the pixel array 201.

As shown in FIG. 4, a counting device in accordance with another exemplary embodiment of the present invention includes a control unit 410, a clock driving unit 420, a first operation unit 430, a second operation unit 440 and a counting unit 450.

The control unit 410 transfers a control signal having a low level voltage and a counter clock to the first operation unit 430 according to a using state of each column during a binning mode operation. That is, during the binning mode operation, in case that specific columns are used, the control unit 410 transfers the counter clock to AND gates of the second operation unit 440, which are corresponding to used columns, through the clock driving unit 420. During the binning mode operation, in case that specific columns are not used, the control unit 410 transfers the counter clock and the control signal having the low level voltage to the first operation unit 430, and the counter clock does not transfer to the AND gates of the second operation unit 440. Herein, the control unit 410 may be a controller of a system, which controls a CMOS image sensor, a column controller, or an external controller.

The clock driving unit 420 receives a counter clock and drives the second operation 440. The first operation unit 430 includes an AND gate.

The first operation unit 430 performs an AND operation for the counter clock and the control signal transferred from the control unit 410 according to a using state of each column during the binning mode operation, and blocks the counter clock of the unused column.

More specifically, the first operation unit 430 receives the counter clock and the control signal through an input terminal of the AND gate and performs the AND operation according to the using state of each column during the binning mode operation. The first operation unit 430 blocks the counter clock which is inputted to the unused column of the second operation unit 440.

Meanwhile, in another exemplary embodiment of the present invention, the first operation unit 430 may be implemented as a switching unit for blocking the counter clock, which is inputted from the control unit 410 to the unused column of the second operation unit 440 in response to the control signal outputted from the control unit 410 according to the using state of each column during the binning mode operation.

The second operation unit 440 includes a plurality of AND gates. The second operation unit 440 receives the counter clock CLK transferred from the control unit 410 and a pixel signal outputted from the pixel array 201, performs the AND operation, and outputs an AND operation result to the counting unit 450. Or, the second operation unit receives the output signal of the first operation unit 430 and a pixel signal outputted from the pixel array 201, and performs the AND operation. Herein, two AND gates of the second operation unit 440 corresponding to the unused column do not transfer an operation result to the counting unit 350 since the first operation unit 430 blocks the counter clock, which is inputted to the unused column.

The counting unit 450 includes first to fourth least significant bit (LSB) counters COUNTER 0 to COUNTER 3. The first and the second LSB counters COUNTER 0 and COUNTER 1 count an output signal of the second operation unit 440. The third and the fourth LSB counters COUNTER 2 and COUNTER 3 do not perform a counting operation since the third and the fourth LSB counters COUNTER 2 and COUNTER 3 do not receive an output signal from the second operation unit 440.

Figure 5:
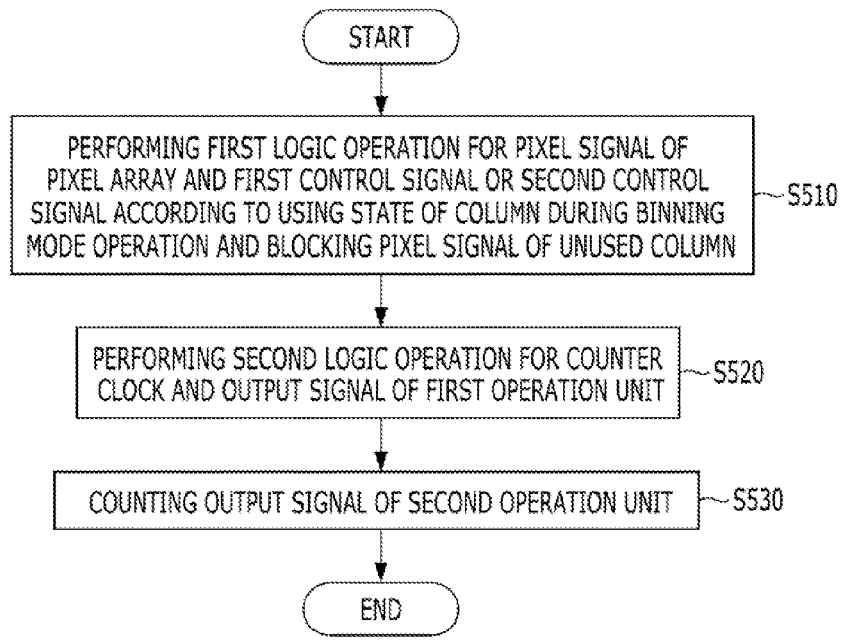
FIG. 5 is a flow chart illustrating a counting method using the counting device shown in FIG. 3 in accordance with an exemplary embodiment of the present invention.

FIG. 5 is a flow chart illustrating a counting method using the counting device shown in FIG. 3 in accordance with an exemplary embodiment of the present invention.

Referring to FIG. 5, according to the using state of each column during the binning mode operation, the first operation unit 330 performs a first logic operation, for example, an AND operation for the pixel signal and the first control signal or the second control signal, transfers the pixel signal of the used column, and blocks the pixel signal of the unused column at a step S510.

Then, the second operation unit 340 performs an AND operation for the counter clock and the output signal of the first operation unit 330 at a step S520.

Subsequently, the counting unit 350 counts the output signal of the second operation unit 330 at a step S530.

Figure 6:
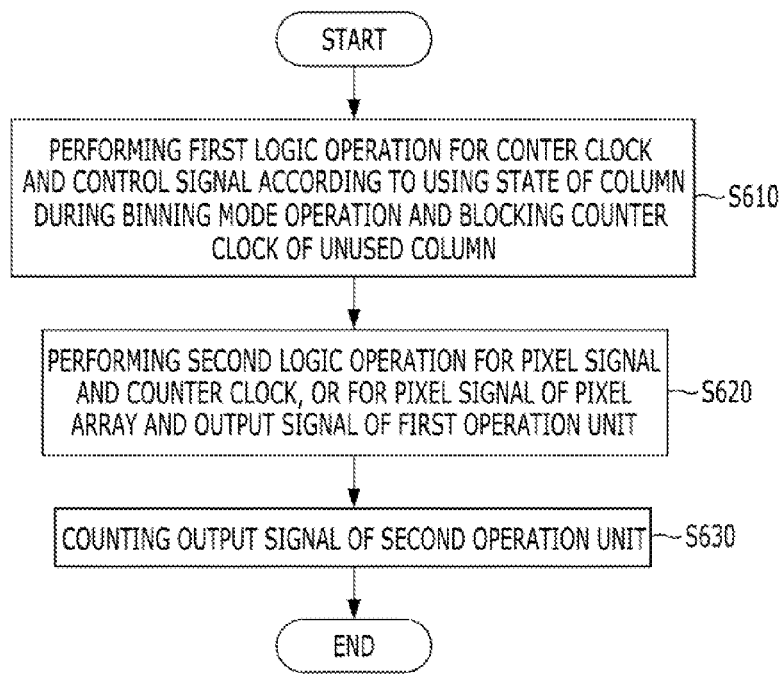
FIG. 6 is a flow chart illustrating a counting method using the counting device shown in FIG. 4 in accordance with another exemplary embodiment of the present invention.

FIG. 6 is a flow chart illustrating a counting method using the counting device shown in FIG. 4 in accordance with another exemplary embodiment of the present invention.

Referring to FIG. 6, according to the using state of each column during the binning mode operation, the first operation unit 430 performs a first logic operation, for example, an AND operation for the counter clock and the control signal, and blocks the pixel signal of the unused column at a step S610.

Then, the second operation unit 440 performs an AND operation for the counter clock and the pixel signal inputted from the pixel array 201, or performs an AND operation for the pixel signal and the output signal of the first operation unit 430 at step S620.

Subsequently, the counting unit 450 counts the output signal of the second operation unit 440 at step S630.

The counting device and method in accordance with embodiments of the present invention may prevent unnecessary power consumption by blocking a clock supply or an input of an unused counter during a binning mode operation of a counter.

Moreover, the counting device and method in accordance with embodiments of the present invention may efficiently control a supply voltage drop caused by a speed increase of a counter clock and maintain a stable circuit operation by blocking unnecessary power consumption.

While the present invention has been described with respect to the specific embodiments, it will be apparent to those skilled in the art that various changes and modifications may be made without departing from the spirit and scope of the invention as defined in the following claims.

What is claimed is:

1. A counting device, comprising:
    a control unit that generates a control signal including a first control signal and a second control signal;
    a first operation unit that performs a logic operation for pixel signals of a pixel array and the first control signal, wherein pixel signals of used column in the pixel array are transferred by using the first control signal, and pixel signals of unused column in the pixel array are blocked by using the second control signal during a binning mode operation;
a second operation unit that performs a logic operation for a counter clock and an output signal of the first operation unit; and
a counting unit that counts an output signal of the second operation unit.

2. The counting device of claim 1, wherein the first operation unit performs AND operations for the pixel signals of the pixel array and the first control signal to output the pixel signals of the used columns in the pixel array to the second operation unit, and performs AND operations for the pixel signals of the pixel array and the second control signal to block the pixel signals of the unused columns in the pixel array.

3. The counting device of claim 1, wherein the first operation unit comprises:
at least one first AND gate that performs an AND operation for the signals of the pixel array and the first control signal during the binning mode operation, and outputs an operation result to the second operation; and
at least one second AND gate that performs an AND operation for the pixel signals of the pixel array and the second control signal during the binning mode operation, and blocks the pixel signals of the unused column.

4. The counting device of claim 1, wherein the first operation unit comprises:
a switching unit that transfers the pixel signals in response to the first control signal and blocking the pixel signals in response to the second control signal.

5. The counting device of claim 1, wherein the second operation unit performs an AND operation for the counter clock and an output signal of the first operation unit, and outputs an AND operation result to the counting unit.

6. A counting device, comprising:
a control unit that generates a counter clock and a control signal; a first operation unit that performs a logic operation for the counter clock and the control signal to block a counter clock corresponding to unused column in a pixel array during a binning mode operation;
a second operation unit that performs a logic operation for pixel signals of the pixel array and the counter clock, wherein pixel signals of used column in the pixel array are transferred by using the counter clock, and pixel signals of unused column in the pixel array are blocked by using an output signal of the first operation unit; and
a counting unit that counts an output signal of the second operation unit.

7. The counting device of claim 6, wherein the first operation unit performs an AND operation for the counter clock and the control signal, and blocks the counter clock to be inputted to the unused column in the pixel array of the second operation unit.

8. The counting device of claim 6, wherein the first operation unit comprises:
a switching unit that blocks the counter clock to be inputted from the control unit to the unused column of the second operation unit in response to the control signal during the binning mode operation.

9. The counting device of claim 6, wherein the second operation unit comprises:
at least one first AND gate that performs an AND operation for the pixel signals of the pixel array and the counter clock outputted from the control unit and outputs an AND operation result to the counting unit; and at least one second AND gate that perform an AND operation for the pixel signals of the pixel array and an output signal of the first operation unit.

10. A counting method, comprising:
performing a first logic operation for pixel signals of a pixel array and a control signal including a first control signal and a second control signal outputted from a control unit, wherein pixel signals of used column in the pixel array are transferred by using the first control signal, and pixel signals of unused column in the pixel array are blocked by using the second control signal during a binning mode operation;
performing a second logic operation for a counter clock and a first logic operation result; and counting a second logic operation result, wherein the performing of the first logic operation includes performing AND operations for the pixel signals of the pixel array and the first control signal to output the pixel signals of the used column in the pixel array, and performing AND operations of the pixel signal of the pixel array and the second control signal to block the pixel signals of the unused column in the pixel array.

11. A counting method, comprising:
performing a first logic operation for a counter clock and a control signal outputted from a control unit during a binning mode operation, and blocking the counter clock for unused column in the pixel array;
performing a second logic operation for pixel signals of the pixel array and the counter clock, wherein pixel signals of used column in the pixel array are transferred by using the counter clock from the control unit, and pixel signals of unused column in the pixel array are blocked by using a first logic operation result; and counting a second logic operation result.

12. The counting method of claim 11, wherein the performing of the first logic operation includes performing an AND operation for the counter clock and the control signal outputted from the control unit using an AND gate according to the used column or the unused column during the binning mode operation.

* * * * *